R. T. WALES.
ACID PROOF AND ELECTROLYTIC TANK.
APPLICATION FILED APR. 1, 1914.
1,202,457.  Patented Oct. 24, 1916.
2 SHEETS—SHEET 1.
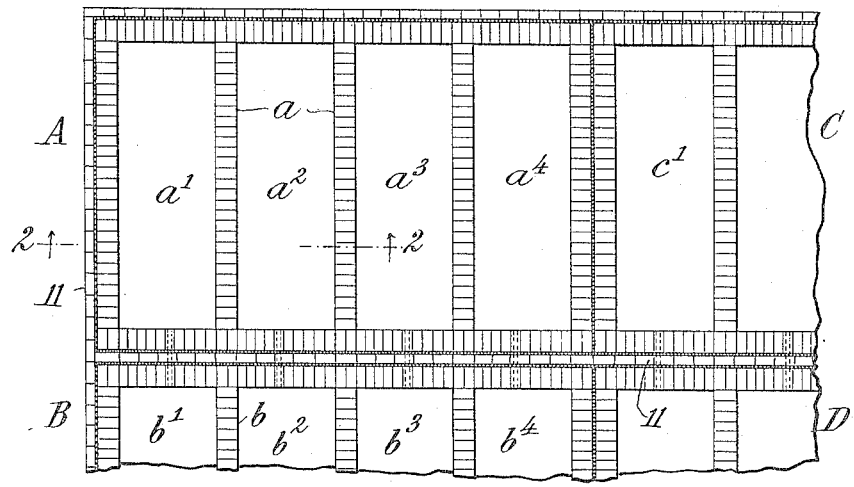
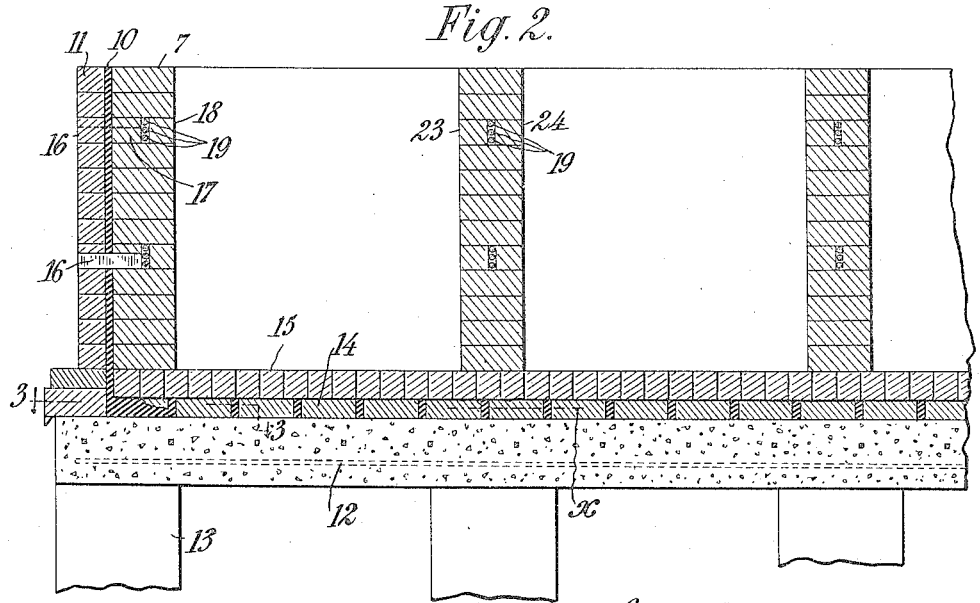
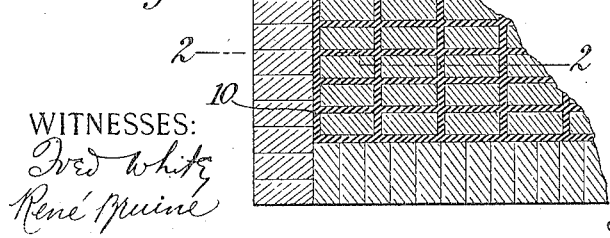
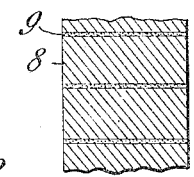
WITNESSES:
Fred White
René Quine
INVENTOR:
Rowland T. Wales,
By Attorneys,
Fraser, Funk & Myers

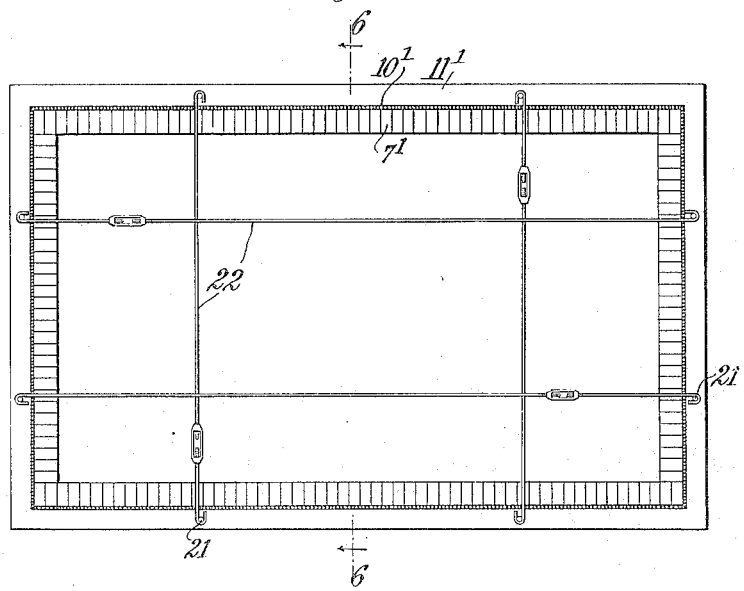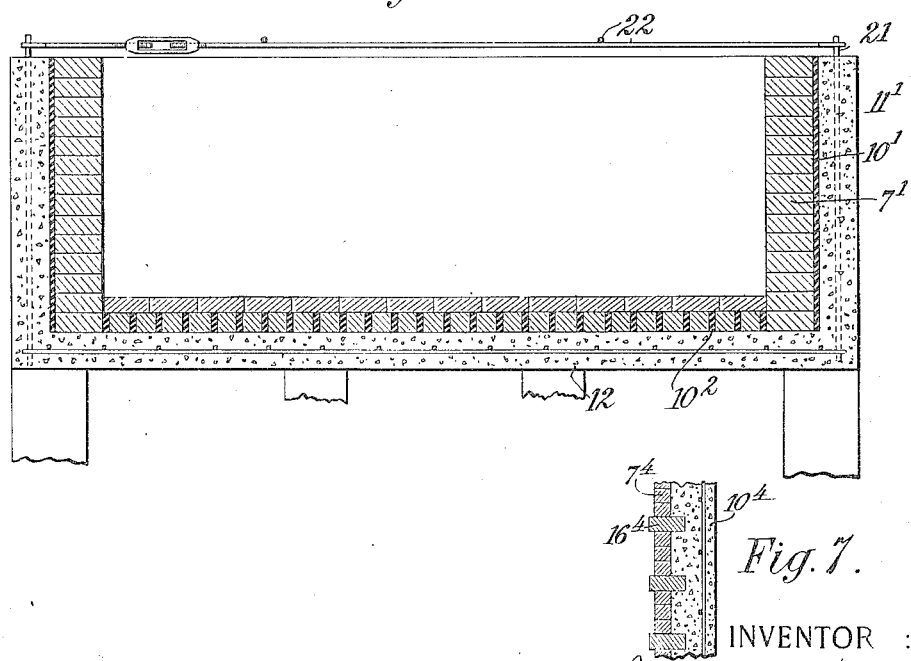

UNITED STATES PATENT OFFICE.

ROWLAND T. WALES, OF SEWAREN, NEW JERSEY.

ACID-PROOF AND ELECTROLYTIC TANK.

1,202,457.        Specification of Letters Patent.      Patented Oct. 24, 1916.

Application filed April 1, 1914. Serial No. 828,773.

*To all whom it may concern:*

Be it known that I, ROWLAND T. WALES, a citizen of the United States, residing at Sewaren, in the county of Middlesex and State of New Jersey, have invented certain new and useful Improvements in Acid-Proof and Electrolytic Tanks, of which the following is a specification.

This invention has for an object to provide a tank particularly adapted for use in carrying out metallurgical, chemical and electrolytic processes and one wherein the lining of the tank is so constructed that it will withstand the corrosion of acids, or of solutions, or of the electrolyte contained in the tank, will in certain installations be a non-conductor of the electric current, and will withstand hard physical usage. The lining is reinforced by a pliable material which compensates for changes in form or dimensions of the lining, owing to changes in its temperature, and which is preferably of a plastic nature for stopping or healing cracks or fissures in the lining whether they arise during the construction of the tank or subsequently.

In the drawings accompanying this specification my invention is illustrated, in which drawings—

Figure 1 represents a plan view of a plurality of electrolytic tanks constructed according to the present invention; Fig. 2 is an enlarged cross-section taken on a plane at about the line 2—2 of Fig. 1, looking in the direction of the arrows; Fig. 3 is a horizontal section of a corner of a tank taken on a plane at about the line 3—3 of Fig. 2, the line 2—2 indicating the plane of Fig. 2; Fig. 4 is an enlarged vertical section of the lining wall; Fig. 5 is a plan view of a storage tank constructed according to the present invention; Fig. 6 is an enlarged cross-section taken on a plane at about the line 6—6 of Fig. 5 looking in the direction of the arrows; Fig. 7 is a vertical section of a wall illustrating a feature of construction.

In tanks for containing acids, acid baths, and liquids having a corrosive action, particularly those tanks wherein electrolytic processes are carried on, it is necessary that the tank shall be lined with material which will withstand corrosion by the solution within it, and will also be serviceable and endure hard usage.

My present invention provides a lining which is impervious and rigid and provides a pliable backing for such lining, such backing preferably being formed of a plastic or semi-fluid material which enters any cracks, fissures or flaws in the lining, thereby sealing or healing such places and preventing leakage from the tank.

Having reference now particularly to Figs. 1 to 4, it will be seen that the impervious lining walls 7 and 15 are built of a series of regularly formed masses or blocks, such for instance as earthenware, kiln made paving blocks 8 laid in an acid proof cement 9. It frequently happens that in the setting, or sometimes in the hard usage to which the tank is subjected, or in settling of supports, minute cracks occur permitting the bath to leak out. To prevent this I have found it desirable after the lining has taken its permanent set to place a backing of plastic material outwardly of the lining, this material being represented at 10 in the illustration. This material is preferably impervious and of a semi-fluid character so that it resists the tendency of any material to leak from the tank, and owing to its fluidity flows into and heals crevices which occur in the lining wall. In tanks for carrying out some processes a pitchy material is employed. Coal tar pitch has been found a satisfactory backing for the lining.

Owing to the fluidity of the backing material 10 it has been found desirable to place outwardly thereof some incasing means. In the illustration this is represented as a permanent structure, namely a wall 11. The wall is preferably rigid and may be laid up of the same material as the lining. The hard masses disposed throughout the seal of pitchy material located between the hard rigid bottom lining and the supporting bed serve to prevent the compression of the seal by the lining.

In building the tank represented in the figures above referred to, a substantially rigid supporting bed is provided in the reinforced concrete bed 12 supported upon suitable piers 13. On the upper surface of this bed there is preferably provided a layer of blocks or masses of hard material; in the illustration this is shown as a series of bricks 14 spaced apart one from the other for permitting the pitchy material to flow around them.

After the brick 14 have been laid on the bed in the manner above described, the pitch is poured between them up to say about the height indicated by the dotted line $x$ in Fig. 2. After this the bottom wall 15 of the lining is laid. In the illustration the walls are separated for the purpose of receiving the pitch 10 which is heated and poured into the space between the rigid inner and rigid outer walls, and also flows down and fills in spaces left open between the bricks 14.

Some suitable system of bonding the inner and outer walls is at times desirable, particularly in large tanks. In Fig. 2 copper plates 16 are shown vertically disposed. The plate 16 extends across the outer wall and into but not through the inner wall alongside the end of the outer block 17 of the inner wall, which block is laid longitudinally of the wall. The end of the plate will be protected from the contents of the tank by means of the block 18, and by a filling between the blocks 17 and 18. These plates are enveloped by the backing. A certain form of commercial paving block is one and one-eighth inches longer than twice its width. By this means blocks 17, 18, 23 and 24 (see Fig. 2) are laid longitudinally of the walls and partitions, whereas the rest of the blocks are shown laid up transversely thereof. This leaves spaces or pockets running longitudinally within the walls and partitions. These longitudinal spaces will in some instances exist in all walls of the tank and in the various partitions dividing the same. Reinforcing rods 19 are shown disposed in these spaces. These rods are embedded in acid-proof cement which fills the remaining space in these longitudinal spaces in walls and partitions.

There is shown in Figs. 1 and 2 a plurality of associated tanks. The tank A is divided by a series of partitions $a$ formed of blocks laid up in the acid-proof cement, into compartments $a^1$, $a^2$, $a^3$, $a^4$, and the tank B is likewise divided by partitions $b$ into compartments $b^1$, $b^2$, $b^3$, $b^4$. In this connection it will be noted that the rigid outer wall 11 between the tanks A and B constitutes the outer wall for both such tanks. Between the tanks A and C, however, the lining for one constitutes the outer wall for the other. For instance the lining at the right hand side of compartment $a^4$ has exteriorly thereof the plastic backing material, and outwardly of that a rigid wall which however is the lining wall for the compartment $c'$. In tanks of considerable depth it is found that when a tank is empty the fluid pressure of the pitchy material 10 becomes excessive upon the walls, particularly when first poured between the lining wall and the outer retaining or incasing wall. To prevent this from causing a displacement of the walls and consequent disruption thereof, it has been found desirable to reinforce these walls. In the electrolytic tank illustrated in Figs. 1 and 2, the partitions such as $a$, besides dividing the tank into compartments, also act as stays for the bottom wall of the lining for preventing the bulging up thereof when the tanks are empty.

In the Figs. 5 and 6 construction the outer wall $11^1$ is shown formed of reinforced concrete and built up in one with the bed plate 12. In the illustration certain reinforcing rods 21 are shown extended above the top of the wall for the engagement of tie rods 22 which may be provided with suitable turn buckles.

In tanks of considerable depth wherein the tank is liable to remain empty for some period of time, I have found it desirable to cut off the communication between the vertically disposed portion $10^1$ of the pitchy backing and the horizontally disposed portion $10^2$ thereof, since the hydraulic pressure of the column $10^1$ will, when the tank is empty and the pitch is in an extremely fluid condition, be transmitted as pressure into the portion $10^2$ thereof and bulge up the lining of the bottom wall of the tank. To guard against this the side wall $7^1$ of the lining is shown laid up from the bed plate 12, the lower block thereof resting upon and being cemented to the bed, thereby cutting off communication between the vertical and the horizontal portions of the pitch above referred to.

An example of the healing plastic backing being a material which after application hardens, is illustrated in Fig. 7, wherein the lining wall $7^4$ is shown built of blocks and acid proof cement, header blocks $16^4$ extending outwardly are disposed at suitable intervals and after this lining wall sets the backing of healing plastic material $10^4$ in the form of concrete is poured against the outer side thereof. The concrete flows around the header blocks which serve as a bond. It also conforms to the profile of the lining wall, and fills and heals the cracks and crevices.

It will be apparent that the disclosure herein is illustrative of the invention, and that any suitable organization of the tanks or parts or assemblies thereof may be used, without departing from the spirit of the invention within the terms of the claims.

I claim as my invention:—

1. A tank comprising a substantially rigid supporting bed, a hard rigid bottom lining disposed above such bed, a seal of pitchy material located between said lining and bed, and a plurality of hard masses disposed throughout said pitchy material and serving to prevent the compression of the seal by the lining.

2. A tank comprising a bed, a course of masses of hard material thereon there being spaces throughout such course, a bottom lining above the said course, side lining walls, an exterior rigid wall outwardly of the side walls of the lining and spaced apart therefrom, pitchy material disposed in said spaces between the side walls, and pitchy material disposed in the spaces throughout such course of masses of hard material upon the bed.

3. A tank comprising a bed, a course of masses of hard material thereon there being spaces throughout such course, a bottom lining above the said course, side lining walls, an exterior rigid wall outwardly of the side walls of the lining and spaced apart therefrom, pitchy material disposed in said spaces between the side walls, and pitchy material disposed in the spaces throughout such course of masses of hard material upon the bed, and communicating with the pitchy material between said side walls.

4. A tank comprising a bed, a course of brick thereon spaced apart, a bottom lining wall above the said course of brick, side lining walls and partition walls, an exterior rigid wall laid up outwardly of the side walls of the lining and spaced apart therefrom, and pitchy material disposed in said space between said side walls, and pitchy material disposed in the spaces between the brick upon the bed.

5. A tank comprising a bed, a course thereon of masses of hard material spaced from each other, a bottom lining wall composed of blocks laid up in acid proof cement, side lining walls laid up of similar material, an exterior rigid wall laid up outwardly of the side walls of the lining and spaced apart therefrom, and pitchy material disposed in said spaces between said side walls, and pitchy material disposed in the spaces throughout said course of masses of hard material upon the bed and communicating with the pitchy material between said side walls.

In witness whereof, I have hereunto signed my name in the presence of two subscribing witnesses.

ROWLAND T. WALES.

Witnesses:
 CHAS. LYON RUSSELL,
 GUSTAVE R. THOMPSON.